US008655813B2

(12) United States Patent
Ananthanarayanan et al.

(10) Patent No.: US 8,655,813 B2
(45) Date of Patent: Feb. 18, 2014

(54) SYNAPTIC WEIGHT NORMALIZED SPIKING NEURONAL NETWORKS

(75) Inventors: Rajagopal Ananthanarayanan, San Jose, CA (US); Steven K. Esser, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 12/982,546

(22) Filed: Dec. 30, 2010

(65) Prior Publication Data

US 2012/0173471 A1     Jul. 5, 2012

(51) Int. Cl.
*G06F 15/18*     (2006.01)
*G06N 3/08*     (2006.01)

(52) U.S. Cl.
USPC ............ 706/25; 706/16; 706/40; 327/527; 327/565

(58) Field of Classification Search
None
See application file for complete search history.

(56) References Cited

U.S. PATENT DOCUMENTS

| | | | |
|---|---|---|---|
| 5,039,870 A | 8/1991 | Engeler | |
| 5,130,563 A * | 7/1992 | Nabet et al. | 706/40 |
| 5,402,519 A | 3/1995 | Inoue et al. | |
| 5,412,256 A | 5/1995 | Alspector et al. | |
| 5,434,530 A * | 7/1995 | Ghoshal et al. | 327/527 |
| 5,784,536 A | 7/1998 | Deville | |
| 5,937,398 A | 8/1999 | Maeda | |
| 6,397,201 B1 | 5/2002 | Arathorn | |
| 7,287,015 B2 | 10/2007 | Cecchi et al. | |
| 7,430,546 B1 | 9/2008 | Suri | |
| 2010/0277232 A1* | 11/2010 | Snider | 327/565 |

OTHER PUBLICATIONS

Snider, "Spike-timing-dependent learning in memristive nanodevices".2008, HP laboratories.*
Choe, Y. et al., "Effects of Presynaptic and Postsynaptic Resource Redistribution in Hebbian Weight Adaptation," Proceedings of the 8th Annual Computational Neuroscience Meeting (CNS '99), Nov. 10, 1999, Pittsburgh, Pennsylvania, Elsevier, pp. 1-6, United States.
Diorio, C. et al., "A Floating-Gate MOS Learning Array with Locally Computed Weight Updates," IEEE Transactions on Electron Devices, vol. 44, No. 12, IEEE, Dec. 1997, pp. 2281-2289, United States.
Ananthanarayanan, R. et al., "Anatomy of a Cortical Simulator," Proceedings of the 2007 ACM/IEEE Conference on Supercomputing, Reno, Nevada, ACM, 2007, pp. 1-12, United States.
Likharev, K., "Hybrid CMOS/Nanoelectronic Circuits: Opportunities and Challenges", Journal of Nanoelectronics and Optoelectronics, vol. 3, American Scientific Publishers, 2008, pp. 203-230, United States.

* cited by examiner

*Primary Examiner* — Kakali Chaki
*Assistant Examiner* — Luis Sitiriche
(74) *Attorney, Agent, or Firm* — Kenneth L. Sherman, Esq.; Michael Zarrabian, Esq.; Sherman & Zarrabian LLP

(57) ABSTRACT

Neuronal networks of electronic neurons interconnected via electronic synapses with synaptic weight normalization. The synaptic weights are based on learning rules for the neuronal network, such that a synaptic weight for a synapse determines the effect of a spiking source neuron on a target neuron connected via the synapse. Each synaptic weight is maintained within a predetermined range by performing synaptic weight normalization for neural network stability.

25 Claims, 10 Drawing Sheets

SYNAPTIC WEIGHT NORMALIZED SPIKING NEURONAL NETWORKS

This invention was made with Government support under Agreement No. HR0011-09-C-0002 awarded by Defense Advanced Research Projects Agency (DARPA). The Government has certain rights in the invention.

BACKGROUND

The present invention relates generally to neuromorphic and synaptronic systems, and more specifically to neuromorphic and synaptronic systems based on spike-timing dependent plasticity.

Biological systems impose order on the information provided by their sensory input. This information typically comes in the form of spatiotemporal patterns comprising localized events with a distinctive spatial and temporal structure. These events occur on a wide variety of spatial and temporal scales, and yet a biological system such as the brain is still able to integrate them and extract relevant pieces of information. Such biological systems can rapidly extract signals from noisy spatiotemporal inputs.

In biological systems, the point of contact between an axon of a neuron and a dendrite on another neuron is called a synapse, and with respect to the synapse, the two neurons are respectively called pre-synaptic and post-synaptic. Neurons, when activated by sufficient inputs received via synapses, emit "spikes" that are delivered to those synapses that the neuron is pre-synaptic to. Neurons can be either "excitatory" or "inhibitory." Synaptic conductance, also called synaptic weight, is a measure of how much influence a synapse will have on its post-synaptic target when the synapse is activated by a pre-synaptic spike. The synaptic conductance can change with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed. The essence of our individual experiences is stored in the conductance of the trillions of synapses throughout the brain.

Neuromorphic and synaptronic systems, also referred to as artificial neuronal networks, are computational systems that permit electronic systems to essentially function in a manner analogous to that of biological brains. Neuromorphic and synaptronic systems create connections between processing elements that are roughly functionally equivalent to neurons of a biological brain. Neuromorphic and synaptronic systems may comprise various electronic circuits that are modeled on biological neurons.

BRIEF SUMMARY

Embodiments of the invention provide neuromorphic and synaptronic systems comprising neuronal networks with synaptic weight normalization, wherein a neuronal network comprises multiple electronic neurons interconnected via multiple electronic synapses. Embodiments of the invention further provide efficient implementation of synaptic weight normalization in spiking neuronal networks.

One embodiment comprises determining synaptic weights for synapses configured for connecting axons of source electronic neurons to dendrites of target electronic neurons in a spiking neuronal network, wherein the synaptic weight changes are based on learning rules for the neuronal network such that the total weight of all electronic synapses to and from a particular electronic neuron is maintained at a predetermined range by performing synaptic weight normalization for neural network stability. The synaptic weight for an electronic synapse determines the effect of a spiking source neuron on a target electronic neuron connected via the electronic synapse. As such, total synaptic weights in the spiking neuronal network are dynamically maintained at a predetermined range for neural network stability, in spite of the perturbations caused by learning rules.

These and other features, aspects and advantages of the present invention will become understood with reference to the following description, appended claims and accompanying figures.

DETAILED DESCRIPTION

Embodiments of the invention provide neuromorphic and synaptronic systems comprising neuronal networks with synaptic weight normalization, wherein a neuronal network comprises multiple electronic neurons interconnected via multiple synapses. Embodiments of the invention further provide efficient implementation of synaptic weight normalization in spiking neuronal networks.

The term electronic neuron as used herein represents an architecture configured to simulate a biological neuron. An electronic neuron creates connections between processing elements that are roughly functionally equivalent to neurons of a biological brain. As such, a neuromorphic and synaptronic system comprising electronic neurons according to embodiments of the invention may include various electronic circuits that are modeled on biological neurons. Further, a neuromorphic and synaptronic system comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic system according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

Figure 1:
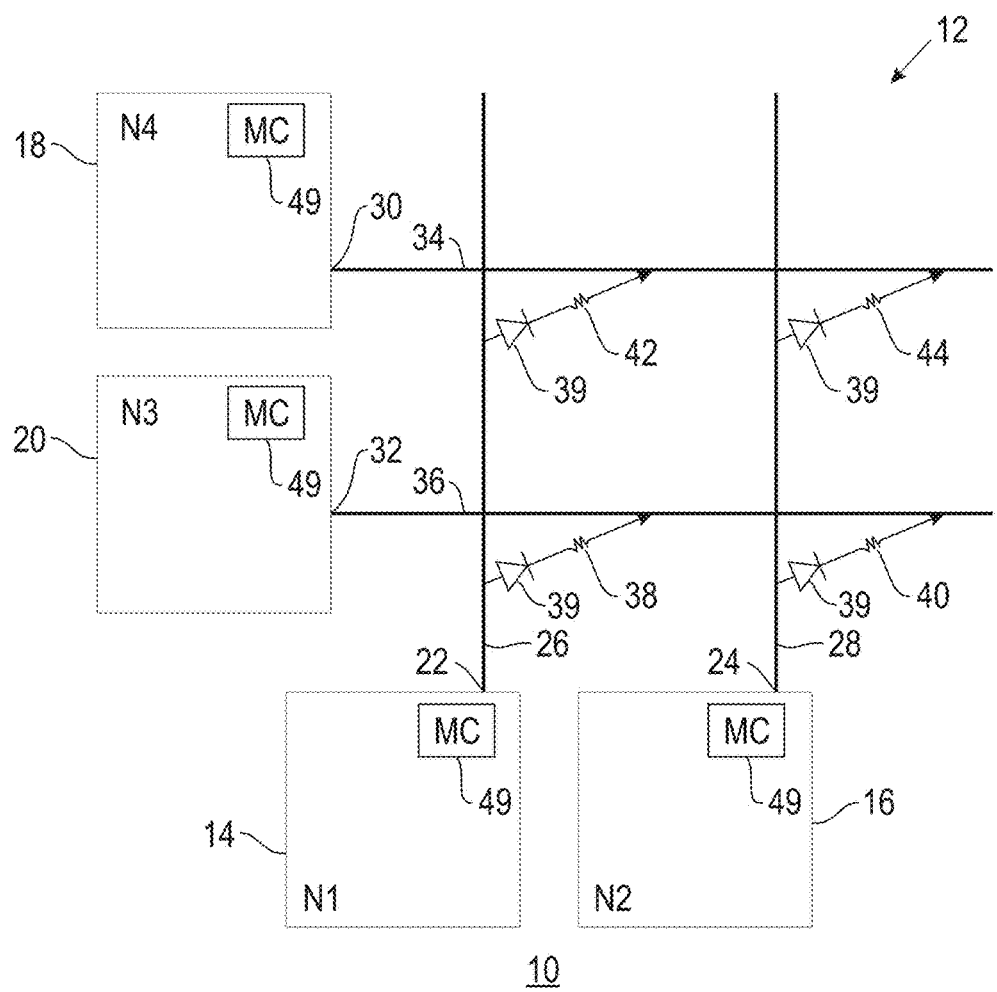
FIG. 1 shows diagram of a neuromorphic and synaptronic system having a crossbar array interconnecting integrate and fire electronic neurons having normalized synaptic weights, in accordance with an embodiment of the invention.

Referring now to FIG. 1, there is shown a diagram of a neuromorphic and synaptronic system comprising a neuronal network implemented as a crossbar array interconnecting electronic neurons. The neuronal network implements synaptic weights using synaptic weight normalization in accordance with an embodiment of the invention, as described further below. In one example, the crossbar array may comprise an ultra-dense cross-bar array that may have a pitch in the range of about 0.1 nm to 10 µm. The neuromorphic and synaptronic system 10 includes a crossbar array 12 having a plurality of neurons 14, 16, 18 and 20, in accordance with an embodiment of the invention. These neurons are also referred to herein as "electronic neurons". Neurons 14 and 16 are axonal neurons and neurons 18 and 20 are dendritic neurons. Axonal neurons 14 and 16 are shown with outputs 22 and 24 connected to electrically conductive axon paths/wires (axons) 26 and 28 respectively. Dendritic neurons 18 and 20 are shown with inputs 30 and 32 connected to electrically conductive dendrite paths/wires (dendrites) 34 and 36 respectively. Axonal neurons 14 and 16 also contain inputs and receive signals along dendrites, however, these inputs and dendrites are not shown for simplicity of illustration. Thus, the axonal neurons 14 and 16 will function as dendritic neurons when receiving inputs along dendritic connections. Likewise, the dendritic neurons 18 and 20 will function as axonal neurons when sending signals out along their axonal connections. When any of the neurons 14, 16, 18 and 20 fire, they will send a pulse out to their axonal and to their dendritic connections.

Each connection between axons 26, 28 and dendrites 34, 36 is made through electronic synapses (synapses), which in one embodiment comprises variable state resistor 38, 40, 42 and 44. The synapses implements synaptic weights based on synaptic weight normalization in accordance with an embodiment of the invention. A weight is associated with each synapse at the point of communication between the axon of a source neuron and the dendrite of a target neuron, as described further below.

The junctions where the variable state resistors are located may be referred to herein as "cross-point junctions". The term "variable state resistor" refers to a class of devices in which the application of an electrical pulse (either a voltage or a current) will change the electrical conductance characteristics of the device. For a general discussion of cross-bar array neuromorphic and synaptronic systems as well as to variable state resistors as used in such cross-bar arrays, reference is made to K. Likharev, "Hybrid CMOS/Nanoelectronic Circuits: Opportunities and Challenges", J. Nanoelectronics and Optoelectronics. 2008, Vol. 3, p. 203-230, 2008, which is hereby incorporated by reference. In one embodiment of the invention, the variable state resistor may comprise a phase change memory (PCM). Besides PCM devices, other variable state resistor devices that may be used in embodiments of the invention include devices made using metal oxides, sulphides, silicon oxide and amorphous silicon, magnetic tunnel junctions, floating gate FET transistors, and organic thin film layer devices, as described in more detail in the above-referenced article by K. Likharev. The variable state resistor may also be constructed using a static random access memory device. Also attached to the variable state resistors is an access device 39, which may comprise a PN diode, an FET wired as a diode, or some other element with a nonlinear voltage-current response.

One embodiment of the invention comprises determining synaptic weights for synapses configured for connecting axons of source electronic neurons to dendrites of target electronic neurons in a spiking neuronal network. The synaptic weight changes are based on learning rules for the neuronal network such that the total weight of all electronic synapses to and from a particular electronic neuron is maintained at (or near) a predetermined range by performing synaptic weight normalization for neural network stability. The synaptic weight for an electronic synapse determines the effect of a spiking source neuron on a target electronic neuron connected via the electronic synapse. As such, total synaptic weights in the spiking neuronal network are dynamically maintained at a predetermined range for neural network stability, in spite of the perturbations caused by learning rules.

According to embodiments of the invention, the synaptic weight of a synapse device an electronic synapse is used to determine the effect (i.e., efficacy of communication) from a source neuron to a target neuron connected via the electronic synapse. Synaptic weight can be implemented in several ways, such as a digital value communicated to the target neuron when the source neuron spikes, as an amount of current applied to the target neuron when the source neuron spikes, or as a conductance level influencing the amount of current applied to the target neuron when the source neuron spikes. Predetermined ranges for synaptic weights depend on the specific configuration of the neural network, as determined by application, according to embodiments of the invention. In one example, a synaptic weight range of about 40% to 60% maximum weighting may be utilized, while in other examples other predetermined ranges such as 1-2%, 10%, 25%, 49-51%, 75%, 90%, 98-99% weighting may be utilized. In all cases, 0% weight indicates no efficacy (minimum or no communication), while 100% weight indicates maximum efficacy (maximum communication) for the electronic synapse. According to embodiments of the invention, predetermined synaptic weight refers to not the weight for a single electronic synapse, but for a set of electronic synapses, wherein the set of electronic synapses can comprise dendritic (incoming) electronic synapses connected to a neuron, or axonal (outgoing) electronic synapses connected to a neuron, or both dendritic and axonal electronic synapses connected to a neuron.

In one embodiment of the invention, said total synaptic weights are dynamically maintained at a predetermined range during simulation on a computing system. In one embodiment of the invention, said total synaptic weights are dynamically maintained at a predetermined range in the neuromorphic and synaptronic system comprising a spiking neural network 10 by a controller module (MC) 49 in each of the neurons (e.g., N1, N2, N3, N4 in FIG. 1). Neurons N1, N2, N3, N4 may each include a pair of RC circuits (not shown).

In general, in accordance with an embodiment of the invention, axonal neurons 14 and 16 will "fire" (transmit or emit a pulse) when the inputs they receive from dendritic input connections (not shown) exceed a threshold. When axonal neurons 14 and 16 fire they maintain an A-STDP variable that decays over time (parameterized to be from a few milliseconds to several seconds). The A-STDP variable decays as a function of time according to functions such as exponential, linear, polynomial, or quadratic functions.

In one embodiment of the invention, the neurons 14, 16, 18, 20 each include a pair of resistor-capacitor (RC) circuits, wherein the A-STDP variable for each neuron decays with a predetermined time constant determined by the values of the resistor and capacitor in one of its RC circuits of the neuron. The A-STDP variable may be sampled by determining the voltage across the capacitor using a current mirror, or equivalent circuit. This variable is used to achieve axonal STDP, by encoding the time since the last firing of the associated neuron. Axonal STDP is used to control "potentiation", which in this context is defined as increasing synaptic conductance.

In another embodiment of the invention, the variable may increase instead of decreasing over time. This variable is used to achieve axonal STDP, by encoding the time since the last firing of the associated neuron. Axonal STDP is typically used to control "potentiation", which in this context is defined as increasing synaptic conductance, but may be used to control "depression", which in this context refers to decreasing synaptic conductance. When dendritic neurons 18, 20 fire, they maintain a D-STDP variable that decays over time (parameterized to be from a few milliseconds to several seconds). The variable decays as a function of time according to functions such as exponential, linear, polynomial, or quadratic functions. The D-STDP variable may be sampled. In another embodiment of the invention, the variable may increase instead of decreasing over time. In any event, this variable may be used to achieve dendritic STDP by encoding the time since the last firing of the associated neuron, as discussed in more detail below. Dendritic STDP is typically used to control "depression", which in this context is defined as decreasing synaptic conductance, but may be used to control "potentiation", which in this context refers to increasing synaptic conductance.

In accordance with an embodiment of the invention, the weights of the synapses undergo synaptic weight normalization using a simulation process. Simulations of large-scale neuronal networks comprising electronic neurons allow modeling of cognitive systems and neurobiological phenomenon. Neurons as processing elements integrate input received from other neurons via their dendrites. When neurons integrate sufficient input they fire, sending a spike via their axons to other neurons. Specifically, integrate and fire electronic neurons simulate the integrative and spiking properties found in biological neurons. Such electronic neurons operate by integrating synaptic inputs into a voltage variable and producing a spike and voltage reset if the voltage exceeds a threshold.

According to embodiments of the invention, a weight is associated with each synapse at the point of communication (e.g., cross-point junction) between the axon of a source neuron (e.g., a pre-synaptic neuron) and the dendrite of a target neuron (e.g., a post-synaptic neuron). The synaptic weight determines how much of an effect a spike produced by a source neuron will have on a target neuron. Synaptic weights change in ways governed by rules that allow the overall neuronal network to evolve through learning. One embodiment of learning is spike timing dependent plasticity (STDP), wherein a change in synaptic weight is determined by the timing between spikes in source and target neurons.

According to embodiments of the invention, to maintain stability in a neuronal network, the synaptic weights are maintained within a predetermined (selected) range. If synaptic weights exceed a first predetermined threshold value of the predetermined range, the neuronal network can become unstable and enter a regime of runaway activity. If synaptic weights are below a second threshold value of the predetermined range, the neuronal network can become very inactive and unresponsive.

According to an embodiment of the invention, ensuring that synaptic weights do not drift beyond a desired stable regime comprises performing synaptic weight normalization. This may be achieved by adjusting the total synaptic weight from one population of neurons to another population of neurons towards a certain selected value. Accordingly, normalization of synaptic weights may comprise: (a) dendritic normalization which imposes restrictions on weights of the synapses viewed from the input side of a neuron and (b) axonal normalization which restricts the weights of the synapses that are on the output side of a neuron.

Simulation of large-scale neuronal networks, especially at the scale of mammalian brains, involves modeling considerations in terms of computer system resources in memory and computation. Computational needs of large simulations involve computational elements (CPU/FPU) with an aggregate capacity to process several quintillion operations every second (the computational needs exceed many petaflops or even an exaflop).

A distributed memory computer system with multiple processors is utilized for neuronal network simulation, according to an embodiment of the invention, wherein each processor has access to memory local to it (local memory). Simulation of a neuronal network comprises utilizing a distributed computing system, wherein simulations of the electronic neurons are distributed amongst the local memories of the multiple processors in the distributed computing system. In order to achieve practically useful turnaround times for simulations, the simulation state is maintained in a main memory (this is especially important when simulations need to execute in near real-time).

The state of the synapses can be stored either with the target neuron, or the source neuron. For improved usage of memory resources, the amount of memory used for every synapse is reduced. The axon of each neuron is distributed among many processors, but the dendrites of a neuron are local (i.e., the synapses are stored in the memory of the same processor as that of the target neuron). Propagating activity in the neuronal network being simulated requires consideration of communication fabric of the distributed computing system. For example, assuming that each neuron fires once every second, each synapse will receive one spike every second of simulation. In the simulation of a biological neuronal network such as the human brain, this will result in up to a quintillion spike messages to be communicated every second.

According to an embodiment of the invention, a normalization process for synaptic weights of a neuronal network is performed in a distributed computing system, utilizing two weight targets for normalization, comprising: a first target on the set of synapses on the output side of a neuron and a second target on the on the set of synapses on the input side of a neuron. Finding or selecting the input total weight is accomplished by summing the synapses that reside with the target neuron, wherein all such synapses are simulated in one processor (the processor where the target neuron is assigned), and hence the input total weight is computed without the need for any communication between processors.

The output total weight is divided into many partial sums, one partial sum for every axonal branch, such that each axonal branch makes synapses onto neurons assigned to exactly one processor. The effective total output weight is calculated by collecting the partial sums from all processors that are the targets of the axonal branches of a neuron. The partial sums are collected at the processor that contains (i.e., simulates) the neuron that is the source of the axonal branches. To properly apply the axonal normalization, the axonal sum is then propagated back to the processors that are the targets of the axonal branches.

Messages for communicating axonal weights are either: sent on a periodic basis (e.g., once every simulation second), or combined with normal spike messages. In the former case (periodic messaging) when the weights need to be sent on a periodic normalization interval, a separate messaging system may be utilized. An example messaging system comprises reduce-scatter communication in the "reverse" direction of the spike messages, providing a reduction in the number and latency of messages. In the latter case (communication messages combined with normal spike messages), a spike communication infrastructure is enhanced by adding the summed axonal weight to a spike message. This preserves efficiency in reducing the number of messages and latency of communication.

According to an embodiment of the invention, a message for the partial axonal sum can be expected at a source neuron if the source neuron had fired in the recent past based on the delay between the source and the target neurons firing. If a processor sent a spike message in the last normalization interval, including the delay, then that processor can expect an axonal partial sum message from the processor that contains the target neuron at the start of the next normalization interval. In effect, every processor has information about when to expect a partial sum message wherein a reduce-scatter scheme need not gather the number of messages that a processor is expected to receive. Thus, each processor simply receives messages from expected processors at the beginning of every normalization interval to receive partial axonal sums and, thus, compute the total axonal sum for every neuron. According to an embodiment of the invention, in a message communication scheme the axonal normalization is performed on a purely local basis such that axonal normalization uses only the branch sum. This avoids the messages for axonal normalization. Other embodiments involve utilizing local normalization on a more frequent basis, and performing strict axon normalization on a longer period or event.

A description of neuronal network characteristics and relationships for achieving STDP in conjunction with the aforementioned normalization schemes, according to an embodiment of the invention, is provided below.

Neuronal Network Elements
$s=(s_1, s_2, \ldots, s_m)$ Population of source neurons
$t=(t_1, t_2, \ldots, t_n)$ Population of target neurons
State Variables
$w_{ij}$ Synaptic weight from neuron $s_i$ to $t_j$
$h_{ij}$ Last activation time of synapse from neuron $s_i$ to $t_j$
c Counter indicating current time
Parameters
$A_t$ Maximum change in $w_{ij}$ per spike in $t_j$
$A_s$ Maximum change in $w_{ij}$ per spike in $s_i$
$\tau_t$ Weight change window time constant for $t_j$ spikes
$\tau_s$ Weight change window time constant for $s_i$ spikes
$\omega_t$ Normalization point for total weight from population s to neuron $t_j$
$\omega_s$ Normalization point for total weight to population t from neuron $s_i$
Dynamics
STDP is implemented as follows. Each time a neuron $t_j$ in t fires, change weights from s to $t_j$ according to example relation (1) below:

$$\Delta w_{ij} = A_t e^{(h_{ij}-c)/\tau_t} \qquad (1)$$

Each time a neuron $s_i$ in s fires, weights are adjusted to t from $s_i$ according to example relation (2) below:

$$\Delta w_{ij} = A_s e^{(h_{ij}-c)/\tau_s} \qquad (2)$$

Normalization Method

In a first normalization method, dendritic normalization comprises, at a desired interval in the simulation, for all $t_j \in t$ weights are adjusted from s to $t_j$ according to example relation (3) below:

$$w'_{ij} = w_{ij} \frac{\omega_t}{\sum_{i=1}^{m} w_{ij}} \qquad (3)$$

As an alternative to dendritic normalization, axonal normalization comprises, at a desired interval in the simulation, for all $s_i \in s$ adjusting weights from t to $s_i$ according to example relation (4) below:

$$w'_{ij} = w_{ij} \frac{\omega_s}{\sum_{j=1}^{n} w_{ij}} \qquad (4)$$

In a distributed computing architecture implementation according to an embodiment of the invention, the first normalization method further comprises collecting synaptic weights as described above, followed by writing the resultant changed weights to the appropriate synapses. In one embodiment, for axonal normalization, the weights are not local to the processor containing the source neuron. In another embodiment, dendrites are distributed across multiple processors and axons kept local.

According to another embodiment of the invention, in a second normalization method, STDP and normalization are combined. As such, each time a neuron $t_j$ in t fires, weights are adjusted from s to $t_j$ according to example relation (5) below:

$$\Delta w_{ij} = A_t \alpha_t e^{(h_{ij}-c)/\tau_t} \qquad (5)$$

wherein $\alpha_t$ is a normalization factor that is calculated according to example relation (6) below:

$$\alpha_t = \frac{\omega_t}{W_{in}} \text{ if } A_t > 0, \text{ else} \qquad (6)$$

$$\alpha_t = \frac{W_{in}}{\omega_t}$$

$$\text{where } W_{in} = \sum_{i=1}^{m} w_{ij}.$$

Each time a neuron $s_i$ in s fires, weights are adjusted from t to $s_i$ according to example relation (7) below:

$$\Delta w_{ij} = A_s \alpha_s e^{(h_{ij}-c)/\tau_t} \qquad (7)$$

wherein $\alpha_s$ is a normalization factor that is calculated according to example relation (8) below:

$$\alpha_s = \frac{\omega_s}{W_{out}} \text{ if } A_s > 0, \text{ else} \qquad (8)$$

$$\alpha_s = \frac{W_{out}}{\omega_s}$$

-continued where $W_{out} = \sum_{i=1}^{m} w_{ij}$.

To achieve a stable neuronal network circuit, either $A_t$ or $A_s$ should be negative, but not both. Thus, if weights exceed w, whichever $A_t$ or $A_s$ is negative will be favored, thereby reducing weights towards ω. If weights become less than ω, the opposite will be true.

According to another embodiment of the invention, the second normalization method may be utilized with binary synapses without hidden variables, by replacing relation (5) with example relation (9) below:

$$p_{ij} = |A_t \alpha_r e^{(h_{ij}-c)/\tau_t}| \qquad (9)$$

wherein $p_{ij}$ is the probability of $w_{ij}$ being set. If $A_t$ is positive, $w_{ij}$ is set to 1, otherwise $w_{ij}$ is set to 0. Further, relation (7) above is replaced with example relation (10) below:

$$p_{ij} = |A_s e^{(h_{ij}-c)/\tau_s}| \qquad (10)$$

wherein $p_{ij}$ is the probability of $w_{ij}$ being set. If $A_s$ is positive, is set to 1, otherwise $w_{ij}$ is set to 0.

Embodiments of a normalization process according to the invention are described below. The normalization process may be implemented in a distributed computing system.

Data Structures

Neuron Structure
1. Membrane potential, etc. (neuron state defined by neuron dynamic relations).
2. Incoming synaptic current since last firing.
3. List of processors that contain neurons on the axonal branches.
4. Timestamp at which neuron last fired.
5. List of (incoming) synapses that were activated since last neuronal firing
6. Total Incoming Synaptic weight $TW_{in}$ and normalization factor $\alpha_t$.
7. Total Outgoing Synaptic weight $TW_{out}$ and normalization factor $\alpha_s$.

Axonal Branch Structure (One Structure on Each Processor in Neuron Processor List)
1. An array of synapse lists, indexed by synaptic delay, one list at each index. Each list enumerates synapses on the axon with the same delay. The array size is the same as the maximum allowable delay, divided by the resolution of the delay. For example, the array size is 20 if the maximum delay is 20 milliseconds with a delay resolution of 1 millisecond. Certain array elements may contain empty synapse lists indicating that a particular axonal branch has no synapses with the corresponding delay.
2. Branch weight. The sum of all synaptic weights in the outgoing synapse list (Axonal Branch Structure list #1).

Synapse Structure
Synapses are located on the same processor as the post-synaptic neuron
1. Synaptic weight.
2. The synapse on the neuron structure list recently activated synapses.
3. Timestamp at which synapse was last activated (used to compute STDP).
4. Target Neuron Identifier.
5. Synapse Type (type of learning).
6. Synapse Channel (AMPA, GABA), etc.

Processes

Figure 2A:
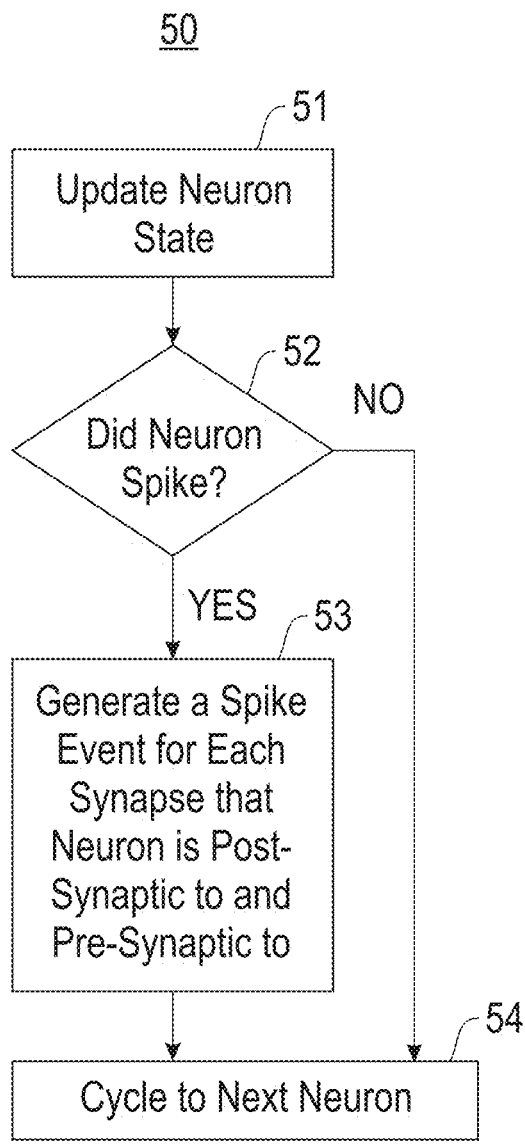
FIG. 2A shows a neuronal network simulation for synaptic weight normalization in a spiking neuronal network, in accordance with an embodiment of the invention.

A high-level neuronal network simulation process 50 according to an embodiment of the invention is shown in FIG. 2A for synaptic weight normalization in a spiking neuronal network, comprising:

For every neuron, in each clock step (time step):
Block 51: Update the state of each neuron;
Block 52: Detect if the neuron spikes (fires);
Block 53: If the neuron spiked, then generate an event for each synapse that the neuron is post-synaptic to and pre-synaptic to;
Block 54: Cycle to the next neuron.

Figure 2B:
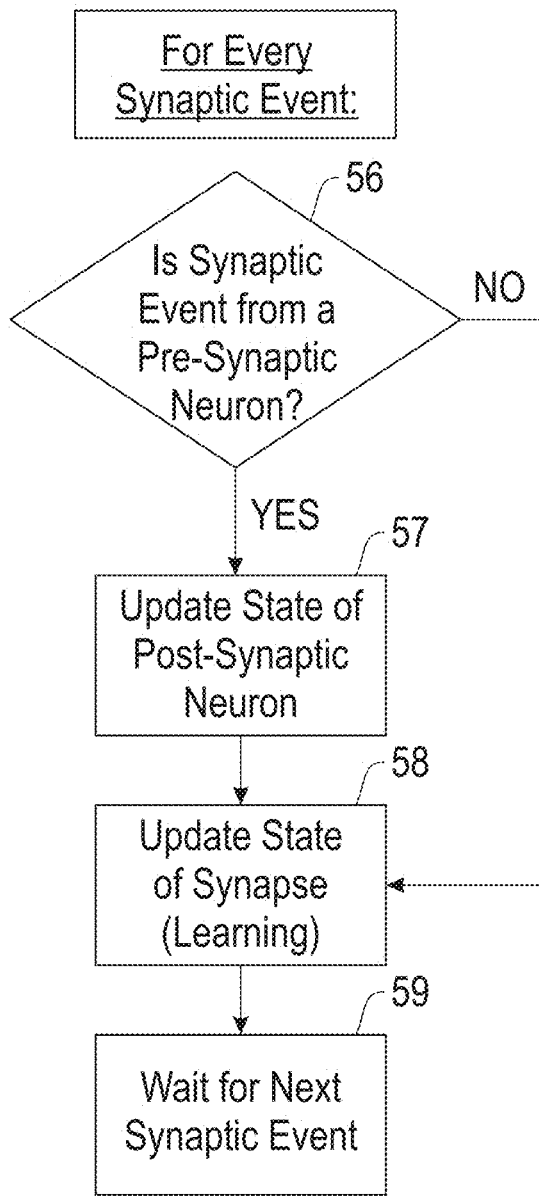
FIG. 2B shows a neuronal network simulation for synaptic weight normalization in a spiking neuronal network, in accordance with an embodiment of the invention.

A high-level neuronal network simulation process 55 according to an embodiment of the invention is shown in FIG. 2B for synaptic weight normalization in a spiking neuronal network, wherein when a synapse receives a pre-synaptic or post-synaptic event, the state of the synapse is updated (i.e., implementing learning) and the state of each post-synaptic neuron corresponding to the synapse is also updated. The process 55 comprises:

For every synaptic event per synapse:
Block 56: Determine if the synaptic event is from a pre-synaptic neuron;
Block 57: If the synaptic event is from a pre-synaptic neuron, update state of the post-synaptic neuron;
Block 58: Update state of the synapse (i.e., learning);
Block 59: Wait for next synaptic event.

Figure 3:
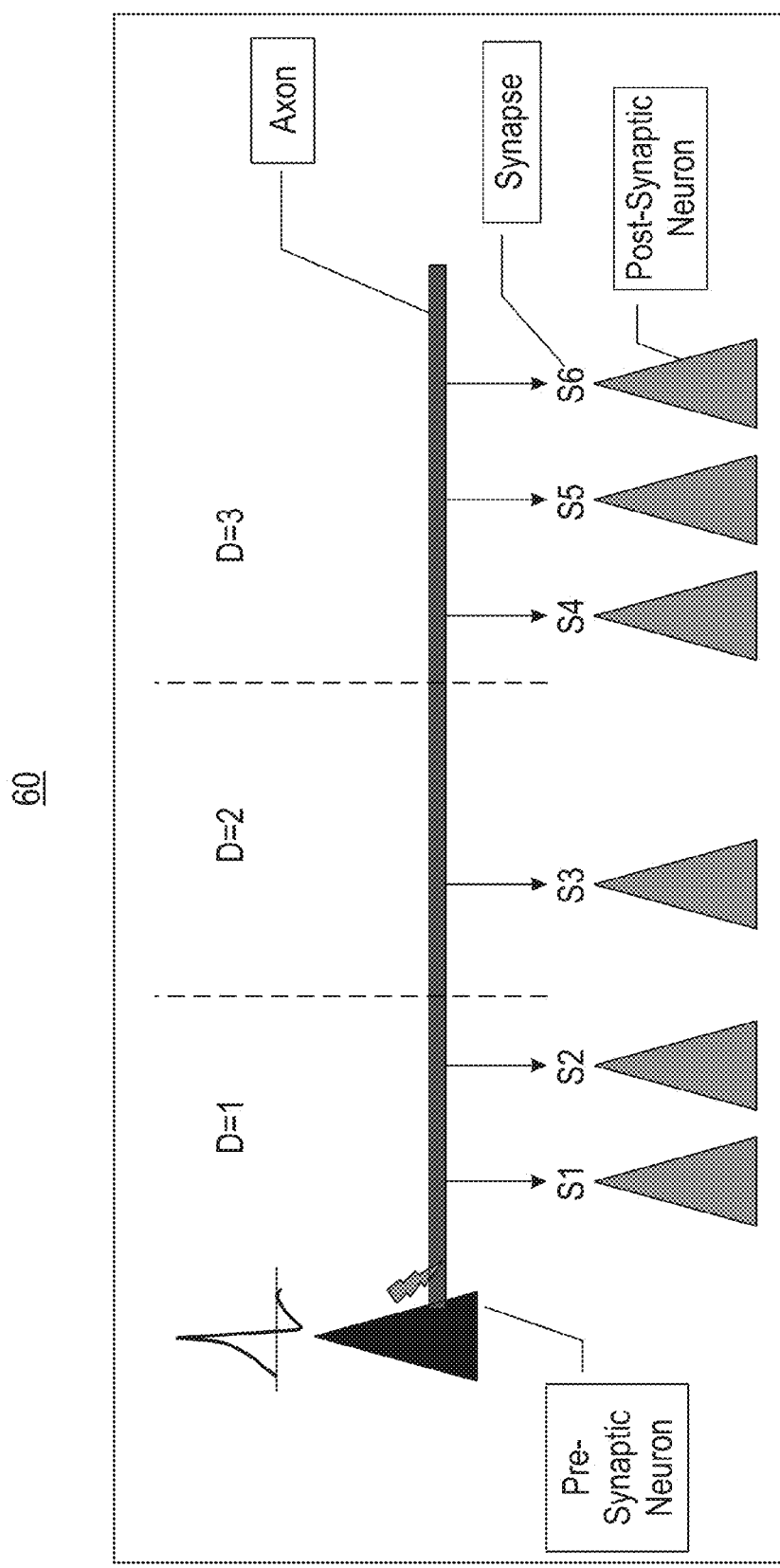
FIG. 3 shows a diagram of neuron and synapse structures in a neuronal network for synaptic weight normalization, in accordance with an embodiment of the invention.

FIG. 3 shows a diagram of neuron and synapse structures in a neuronal network 60, according to an embodiment of the invention. A pre-synaptic neuron communicated with post-synaptic neurons through an axon via synapses $s_1$-$s_6$. Sorting of synapses according to their axonal delay D is also illustrated.

Figure 4:
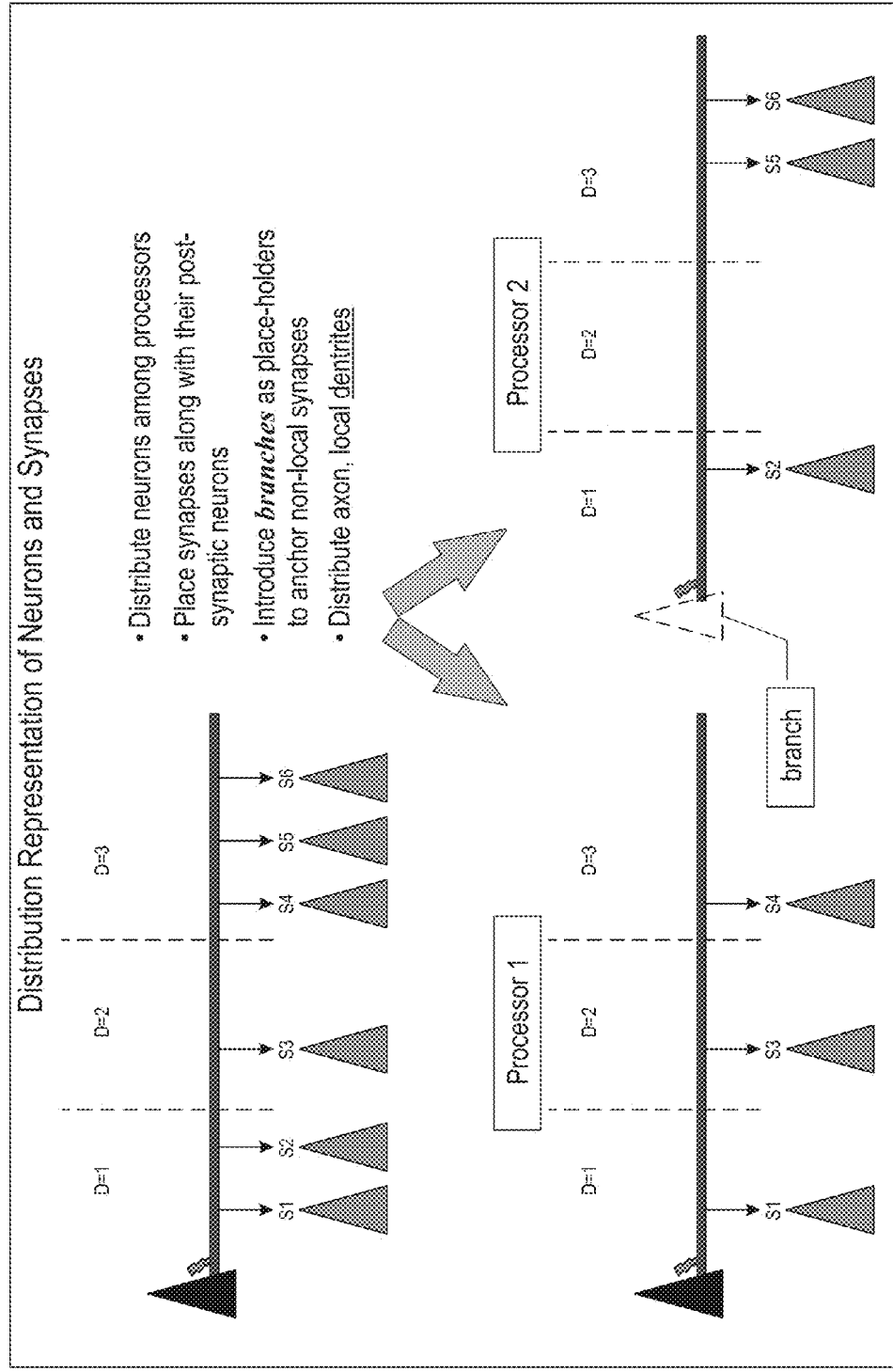
FIG. 4 shows a process for distribution of the neurons and synapses of a neuronal network among multiple processors in a distributed computing system for neuronal network simulation, in accordance with an embodiment of the invention.

FIG. 4 shows a process 70 for distribution of the neurons and synapses of the neuronal network 60 among multiple processors (e.g., Processor 1, Processor 2) in a distributed computing system, according to an embodiment of the invention.

Assuming that all spikes are discretized to a grid with 1 ms resolution, axonal delay D of every neuron is an integer in the range [1, δ], where δ is the event horizon. For neuron n, let S(n, d) denote the set of synapses to which neuron axon connects with delay d. For some delay d, the set S(n, d) can be empty. Let $\overline{D}(n)$ denote the smallest delay such that the corresponding set of synapses S(n, $\overline{D}$(n)) is non-empty. Let E(i), 1≤i≤δ, denote the set of synapses to be activated in the future. These event sets are organized in a circular queue of length δ such that the set of events E(mod(t,δ)+1) will be processed at time t. All sets E(i), 1≤i≤δ, are initialized to be empty. For every neuron n: initialize total incoming weight ($TW_{in}$) by adding weights of all incoming synapses into n (i.e., all synapses which have n as its post-synaptic neuron), and initialize normalization factor $\alpha_t$ using $TW_{in}$ as in relation (6) above. For every neuron n: initialize total outgoing weight ($TW_{out}$) by adding weights of all outgoing synapses from n (i.e., all synapses which have n as its pre-synaptic neuron), and initialize normalization factor $\alpha_t$ using $TW_{out}$ as in relation (8) above.

A single processor pseudo code for a simulation timestep, according to an embodiment of the invention, is provided below:

SynAct1 (Process Current Events)
Activate synapses in the set E(mod(t,δ)+1)
SynAct2 (Generate Future Events)
For each set S(n,d) in E(mod(t, δ)+1), if there exists a delay d' such that d<d'≤δ and S(n,d') is non-empty, then insert S(n,d') in the set E(mod(t+d'−d, δ)+1; clear the set E(mod(t,δ)+1).

DSTDP
For each synapse that is activated, let n be the post-synaptic neuron and m be the pre-synaptic
Neuron:
1. Update the state of the post-synaptic neuron n by the associated synaptic weight
2. (a) compute the change in weight $\Delta w$ using relation (7) (STDP and $\alpha_s$),
   (b) change the synapse by $\Delta w$,
   (c) add $\Delta w$ from $Tw_{in}$ of post-synaptic neuron n and subtract $\Delta w$ from $TW_{out}$ of pres-synaptic neuron m,
   (d) place the synapse on the list of recently activated synapses R(n) for the corresponding neuron n.
B2 Set the list F of fired neurons to be the empty set
NrnUpd
For each neuron n,
1. with some stimulus probability, provide the neuron with super-threshold stimulus,
2. update the neuron state,
3. if the neuron fires, then
   i. reset the neuron state,
   ii. add the neuron to list F,
   iii. insert set S(n, D(n)) into the event set E(mod(t+D (n), $\delta$)+1).
PSTDP
For every neuron n in list F, and for each of its synapses on the list R(n), let the pre-synaptic
neuron of the synapse be m (the post-synaptic neuron is n),
(a) compute the change in weight $\Delta w$ using relation (6) (STDP and $\alpha_t$),
(b) change the synapse by $\Delta w$,
(c) add $\Delta w$ to $TW_{in}$ of post-synaptic neuron n and subtract $\Delta w$ from $TW_{out}$ of pres-synaptic neuron m. Clear the list R(n).
Dendritic Normalization
If this timestep is at the interval for dendritic normalization, for each neuron n, recalculate normalization factor $\alpha_t$ using $TW_{in}$ as in relation (6).
Axonal Normalization
If this timestep is at the interval for axonal normalization, for each neuron n, recalculate normalization factor $\alpha_s$ using $TW_{out}$ as in relation (8).

Figure 5:
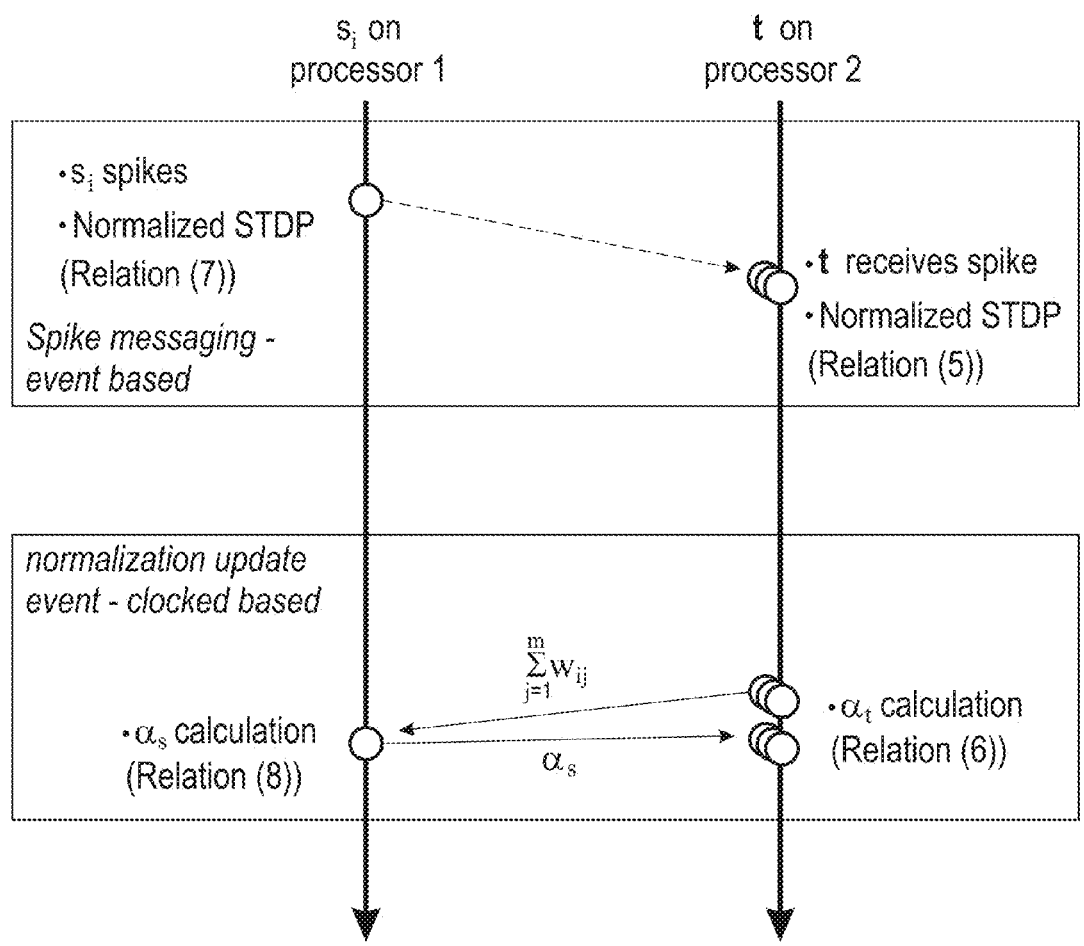
FIG. 5 shows a normalized STDP process with synaptic weight normalization on a multi-processor system, in accordance with an embodiment of the invention.

A multi-processor process for a simulation timestep, according to an embodiment of the invention, is described below in conjunction with process 80 in FIG. 5, illustrating normalized STDP process on a multi-processor system for neuron $s_i$ and target neurons in t. Let N denote the total number of processors. For neuron n on processor x, let S((n, x), d; y), $1 < d' \leq \delta$, denote the set of synapses that it makes on processor y with axonal delay d. For every neuron-processor pair (n, x) such that:

$$\cup_{d=1}^{\delta} = S((n,x),d;y)$$

is not empty, ensuring that processor y knows the sets of connections during the initial set-up. In other words, for every axon from a non-local neuron that comes to a processor, all its contacts and delays are locally known. Let D(n, x; y) denote the smallest delay such that the set of synapses S((n, x), D(n, x; y); y) is non-empty. For each processor x, the event sets Ex(i), $1 \leq x \leq \delta$, are initialized to be empty. The meaning and use of these sets is analogous to the sets E(i), $1 \leq i \leq \delta$, in the single processor setting, wherein:

$$E(i) = \cup_{x=1}^{N} E^x(i), 1 \leq i \leq \delta.$$

According to an embodiment of the invention, the initialization of total incoming weight ($TW_{in}$) of every neuron on every processor is the same as in the single processor case. Because the incoming synapses are stored on the same processor as a post-synaptic neuron of a synapse, this can be accomplished locally on every processor, without the need for any communication. The calculation of total outgoing weight ($TW_{out}$) is not performed locally because the outgoing synapses are not necessarily on the same processor as the pre-synaptic neuron (i.e., the axons are distributed). In that regard, according to an embodiment of the invention, a partial sum may be utilized with the axonal branch of a neuron on every processor that is targeted by the axonal branches. For every neuron n and every processor x that is the target of an axonal branch of n, branch weight (BW) is maintained on processor x. In the example shown in FIG. 4, BW is stored in the "branch" triangle. Then BW and $TW_{out}$ are initialized as follows (BW is by definition outgoing weight):

Step 1: For every axonal branch on processor x of neuron n:
(a) initialize BW by adding weights of all outgoing synapses from n, that is, the synapses on the axon branch on processor x of neuron n and (b) send a message containing BW for n from processor x to processor y, where y is the processor where neuron n is stored.

Step 2: For every processor y, for every neuron n: (a) receive one BW message from each processor in list of processors that contain neurons on the axonal branches of the neuron n. After all BW messages have been received by processor y, initialize total outgoing weight ($TW_{out}$) of the neuron n by adding received BW weights, (b) initialize normalization factor $\alpha_s$ using $TW_{out}$ (as in relation (8)) and (c) send $\alpha_s$ to all processors on the list of processors that contain neurons on the axonal branches of the neuron n.

Step 3: For every axonal branch on processor x of neuron n: receive one $\alpha_s$ message from processor y, where y is the processor where neuron n is stored. Steps 1-3 directly map onto an MPI primitive similar to MPI_ReduceScatter using a subset of the processors for a communication object.

For each processor x:

$B1x = MPI\_Comm\_rank( ), N = MPI\_Comm\_size( )$

SynAct1 (Process Current Events)
Activate synapses in the set Ex(mod(t,$\delta$)+1)
SynAct2 (Generate Future Events)
For each set S((m,z),d; x) in $E^x$(mod(t,$\delta$)+1), if there exists a delay d' such that d<d'$\leq \delta$ and S((m,z),d'; x) is non-empty, then insert S((m,z),d'; x) in the set $E^x$(mod(t+d'−d, $\delta$)+1. Clear the set Ex(mod(t, $\delta$)+1).
DSTDP For each synapse that is activated:
1. Update the state of the post-synaptic neuron n by the associated synaptic weight.
2. (a) Compute the change in weight $\Delta w$ using relation (7) (STDP and $\alpha_s$), (b) Depress the synapse by $\Delta w$, and (c) Subtract $\Delta w$ from $TW_{in}$ of post-synaptic neuron n and subtract $\Delta w$ from BW of pre-synaptic neuron m.
3. Place the synapse on the list of recently activated synapses R(n) for the corresponding neuron n.
B2 Set the list F of fired neurons to be the empty set. Initialize $M_x(y)=0$, $1 \leq y \leq N$.
NrnUpd
For each neuron n:
1. with some stimulus probability, provide the neuron with super-threshold stimulus.
2. update the neuron state.
3. if the neuron fires, then:
   (a) reset the neuron state.
   (b) add the neuron to list F.

(c) if the neuron connects to any synapse on processor y, then prepare to send a message (n,x) to processor y by adding n to a message destined from x toy. If the message becomes full, then send it using MPI_Isend. Increment the number of messages sent $M_x(y)$.

FlshMsg

Flush any non-empty, non-full messages destined for any processor y using MPI_Isend. Increment the number of messages sent $M_x(y)$ by 1.

PSTDP

For every neuron n in list F, and for each of its synapse on the list R(n)

1. (a) compute the change in weight w, Δ, using relation (5) (STDP and $α_t$), (b) reward the synapse by Δw, and (c) add Δw to $TW_{out}$ of post-synaptic neuron n and add Δw to BW of pres-synaptic neuron m.
2. Clear the list R(n).

MeX1

Using MPI_ReduceScatter send $M_x(1), \ldots, M_x(N)$ to processor 0 and receive the count of incoming messages to this processor $$M(x) = \sum_{y=1}^{N} M_y(x).$$

MeX2

Using MPI_Recv, receive M(x) messages each of the form (m,z). Now, for each message, N1 insert set S((m,z), D(m,z; x); x) into the event set $E^x(\text{mod}(T+\underline{D}(m,z; x), \overline{δ})+1)$.

According to an embodiment of the invention, a dendritic normalization process comprises, if the timestep is at the interval for dendritic normalization, for each neuron n, recalculate normalization factor $α^r$ using $TW_{in}$ as in relation (6).

According to an embodiment of the invention, an axonal normalization process comprises, if the timestep is at the interval for axonal normalization, repeat Steps 1(b) through Step 3 of initialization of BW and $TW_{out}$ comprising:

Send a message containing BW for n from processor x to processor y, where y is the processor where neuron n is stored.

Every processor y, for every neuron n: (a) receive one BW message from each processor in list of processors that contain neurons on the axonal branches of the neuron n. After all BW messages have been received by processor y, set total outgoing weight ($TW_{out}$) of the neuron n, by adding received BW weights, (b) recalculate normalization factor $α_s$ using $TW_{out}$ as in relation (8), and (c) send $α_s$ to all processors in list of processors that contain neurons on the axonal branches of the neuron n.

For every axonal branch on processor x of neuron n: receive one $α_s$ message from processor y, where y is the processor where neuron n is stored.

Figure 6:
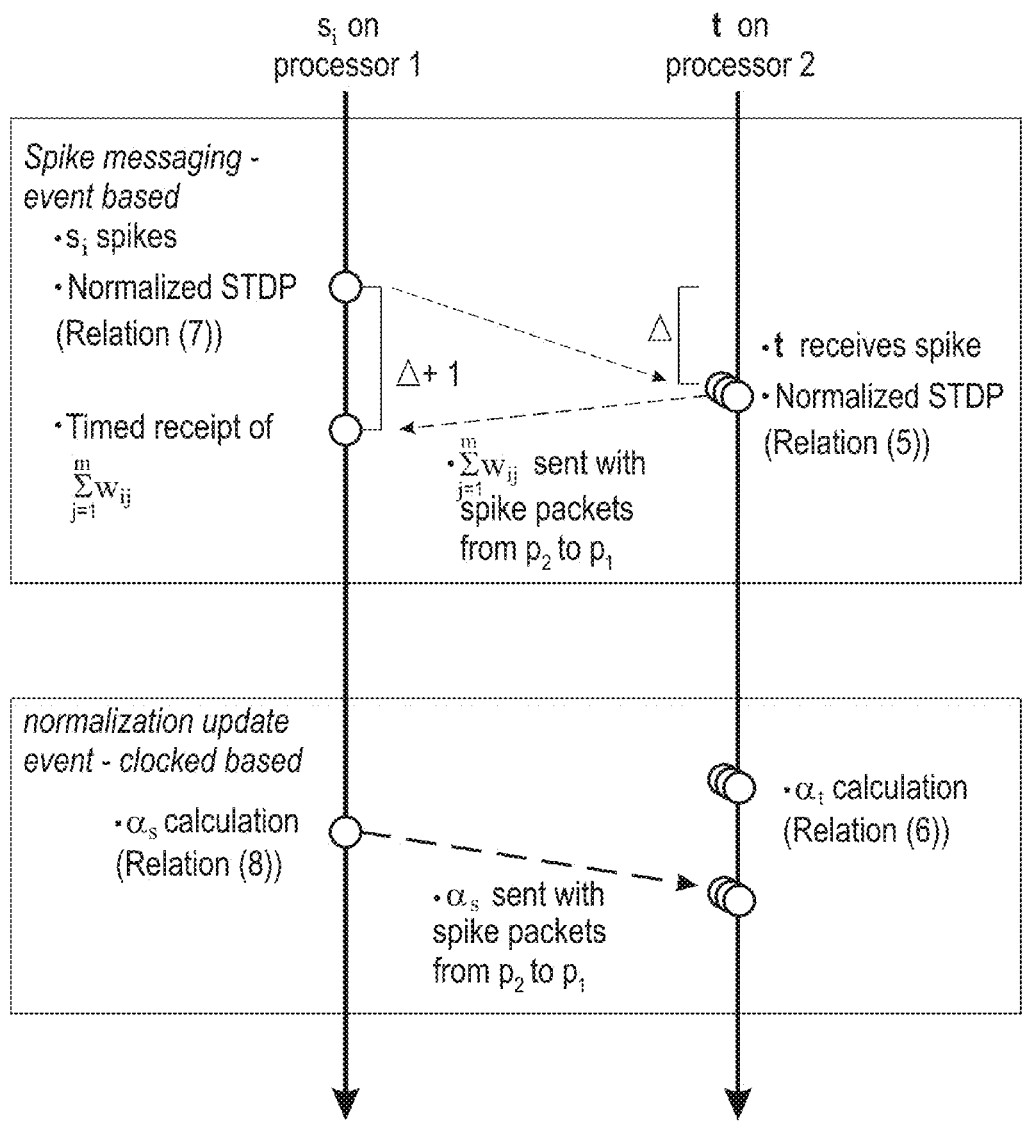
FIG. 6 shows a normalized STDP process with synaptic weight normalization on a multi-processor system, in accordance with an embodiment of the invention.

According to an embodiment of the invention, variations on the multiprocessor approach are possible. For example, as shown by the example process 85 in FIG. 6, weights may be passed from target neurons on one processor back to source neurons on a different processor along with the spike messages normally sent in the SynAct2 step above. This information can be sent each time the target neurons receive inputs from the sources. As each source neuron will then know to expect the returned weight information, they can wait for this information in a specific timestep. Once $α_s$ is calculated, it can be sent back to the target neurons for use along with normal spike messaging traffic, rather than in its own message. FIG. 6 illustrates a normalized STDP process on a multi-processor system for neuron $s_i$ and target neurons in t.

According to an embodiment of the invention, calculating $α_s$ in a purely local fashion improves efficiency. In this case, on each processor a different $α_s$ value is calculated for each source neuron (cell) that sends projections to that processor. This calculation is according to the synaptic weights from the source neuron to the target neurons found on that processor. Therefore, each source neuron has multiple $α_s$ values, one for each processor targeted by that neuron. This system eliminates the need to pass synaptic weights and $α_s$ values between processors. According to an embodiment of the invention, efficiency can further be improved by infrequently calculating a single $α_s$ value for each neuron in the axonal normalization process in the multiprocessor normalization. Values of $α_s$ local to each processor may then be adjusted on a more frequent basis according to the synaptic weights found on that processor.

Figure 7:
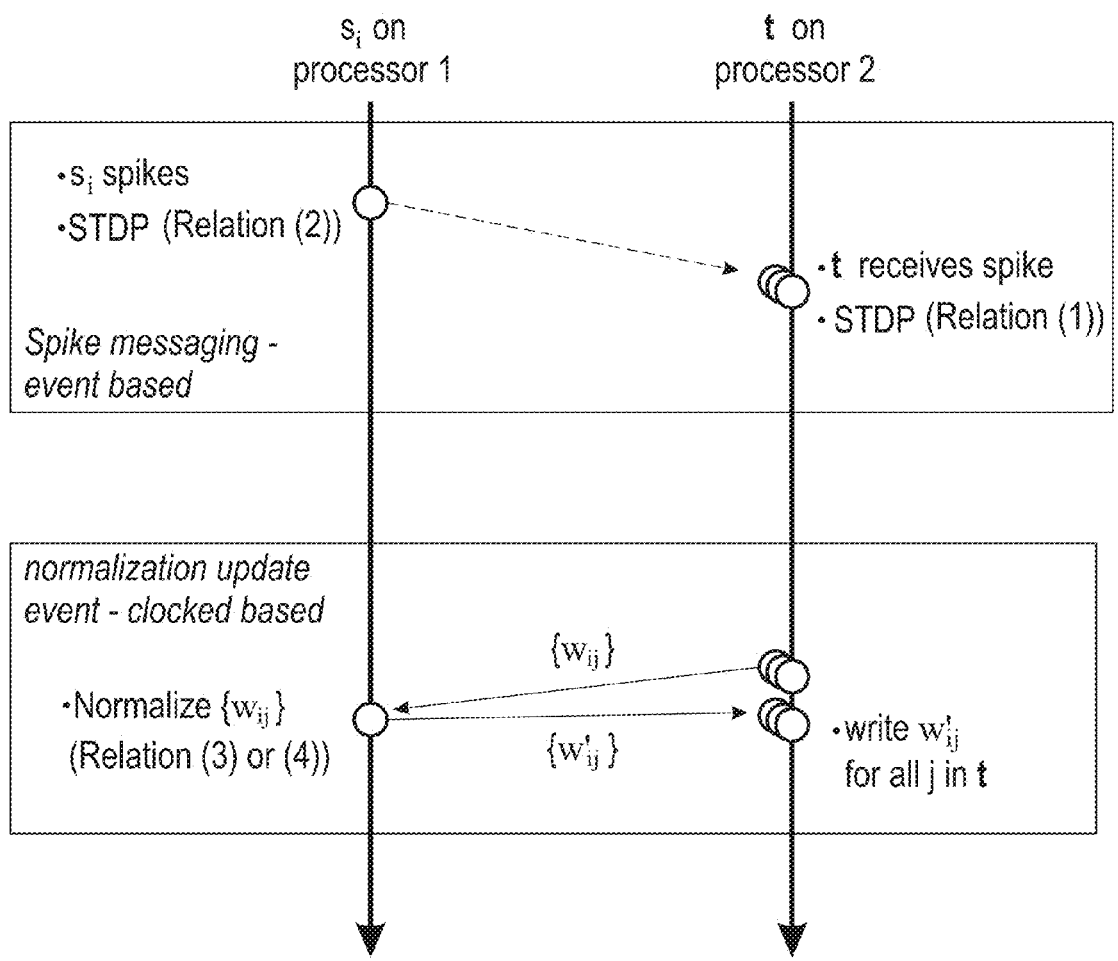
FIG. 7 shows a normalized STDP process with synaptic weight normalization on a multi-processor system, in accordance with an embodiment of the invention.

According to an embodiment of the invention, as illustrated by the process 90 in FIG. 7, direct normalization, as in relations (3) and (4), may also be performed by modifying the multiprocessor normalization process to collect and set weights in a clock-based fashion. FIG. 7 illustrated normalization in a purely clock driven fashion on a multi-processor system for neuron $s_i$ and target neurons in t.

As such, according to embodiments of the invention, synaptic weight normalization comprises providing neuronal network stability by maintaining a synaptic weight within a predetermined range. The predetermined range comprises two weight limits (i.e., thresholds) set by input and output sides of an electronic neuron wherein the input is the summation of synapses that reside with a target neuron and output is the partial sums from all neurons that are targets of axonal branches. Dendritic normalization weights are determined as viewed from the input side of a neuron. Further, axonal normalization weights that are on the output side of a neuron are determined. Dendritic normalization weights are collected and written to the appropriate synapses. The axonal sum is propagated back to the neurons that are the targets of the axonal branches.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
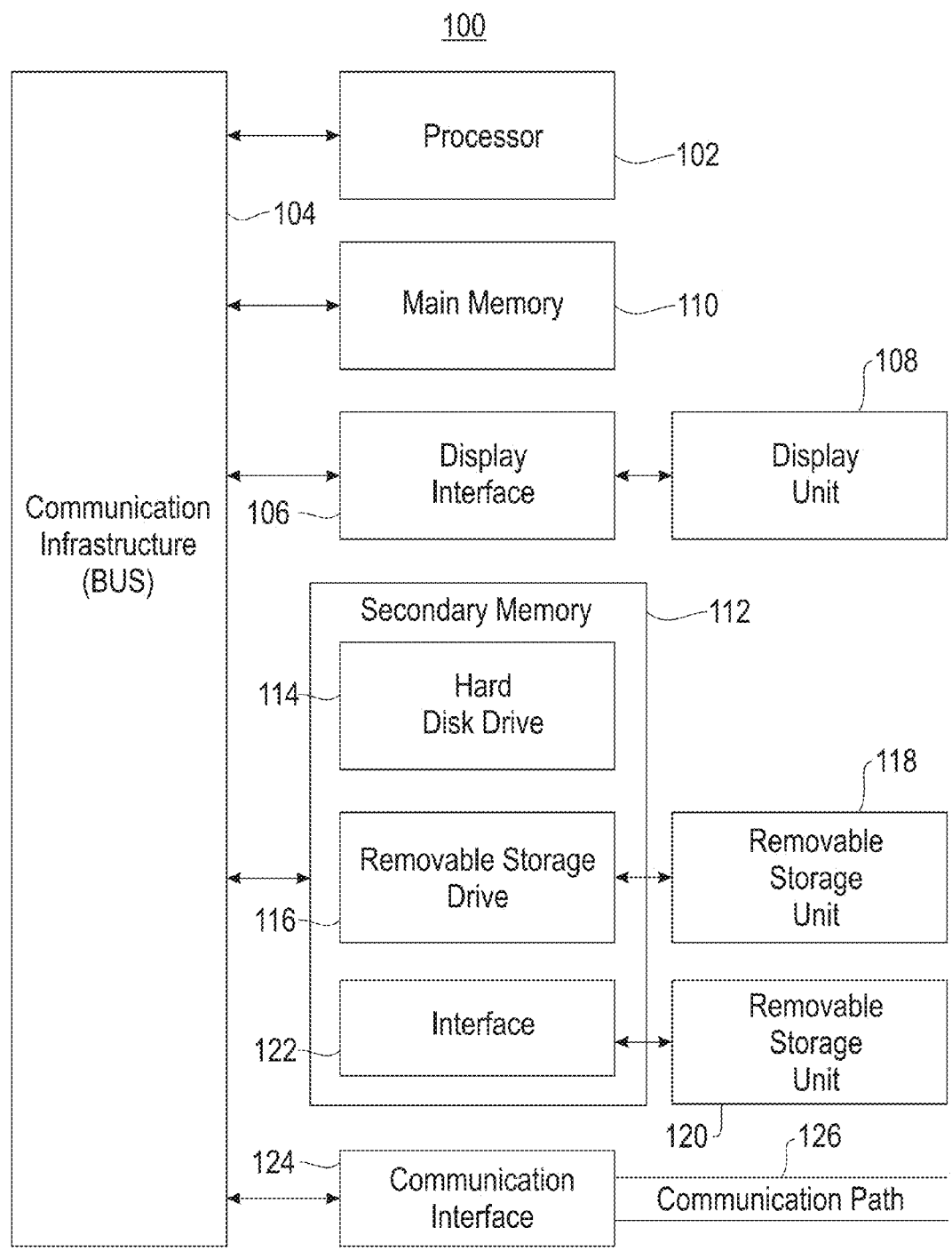
FIG. 8 shows a high level block diagram of an information processing system useful for implementing one embodiment of the invention.

FIG. 8 is a high level block diagram showing an information processing system 100 useful for implementing one embodiment of the present invention. The computer system 100 includes one or more processors, such as a processor 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc., which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via a communication interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

Figure 9:
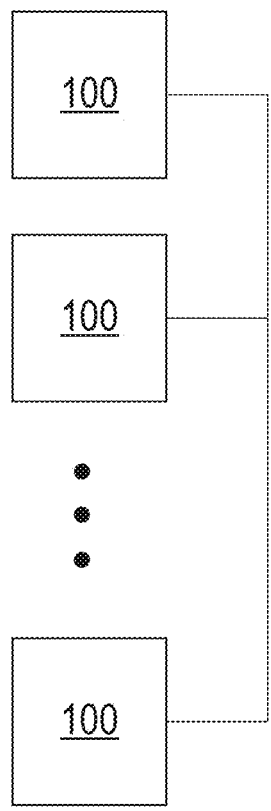
FIG. 9 shows another information processing system useful for implementing one embodiment of the invention.

FIG. 9 is a high level block diagram showing a distributed information processing system 200 including multiple interconnected information processing systems 100, useful for implementing one embodiment of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
    determining synaptic weights for electronic synapses configured for connecting axons of source electronic neurons to dendrites of target electronic neurons in a spiking neuronal network, wherein the synaptic weights are based on learning rules for the neuronal network, such that a synaptic weight for an electronic synapse determines the effect of a spiking source electronic neuron on a target electronic neuron connected via that electronic synapse; and
    dynamically maintaining total synaptic weights in the spiking neuronal network at a predetermined range for neural network stability by adjusting a synaptic weight for at least one electronic synapse;
    wherein, for an electronic synapse connected to an electronic neuron, a synaptic weight for said electronic synapse is adjusted based on a total synaptic weight for electronic synapses connected to said electronic neuron.

2. The method of claim 1, wherein dynamically maintaining total synaptic weights in the spiking neuronal network further comprises:
    for each electronic neuron, dynamically maintaining a corresponding total in-coming synaptic weight for said electronic neuron at a predetermined range, wherein said corresponding total in-coming synaptic weight is based on each synaptic weight for each electronic synapse connected to a dendrite of said neuron.

3. The method of claim 2, wherein:
    dynamically maintaining a corresponding total in-coming synaptic weight for an electronic neuron at a predetermined range comprises synaptic weight normalization by adjusting one or more learning rule parameters for a learning rule, wherein a synaptic weight for at least one electronic synapse connected to a dendrite of said electronic neuron is normalized.

4. The method of claim 3, wherein:
    if a corresponding total in-coming synaptic weight for an electronic neuron is greater than a predetermined range, one or more learning rule parameters for a learning rule are adjusted such that the learning rule decreases synaptic potentiation on electronic synapses connected to a dendrite of the electronic neuron; and
    if a corresponding total in-coming synaptic weight for an electronic neuron is less than a predetermined range, one or more learning rule parameters for a learning rule are adjusted such that the learning rule increases synaptic potentiation on electronic synapses connected to a dendrite of the electronic neuron.

5. The method of claim 1, wherein dynamically maintaining total synaptic weights in the spiking neuronal network further comprises:
    for each electronic neuron, dynamically maintaining a corresponding total out-going synaptic weight for said electronic neuron at a predetermined range, wherein said corresponding total outgoing synaptic weight is based on each synaptic weight for each electronic synapse connected to each axon of said neuron.

6. The method of claim 5, wherein:
    dynamically maintaining a corresponding total out-going synaptic weight for an electronic neuron at a predetermined range comprises synaptic weight normalization by adjusting one or more learning rule parameters for a learning rule, wherein a synaptic weight for at least one electronic synapse connected to an axon of said electronic neuron is normalized.

7. The method of claim 6, wherein:
    if a corresponding total out-going synaptic weight for an electronic neuron is greater than a predetermined range, one or more learning rule parameters for a learning rule are adjusted such that the learning rule decreases synaptic potentiation on electronic synapses connected to an axon of the electronic neuron; and
    if a corresponding total out-going synaptic weight for an electronic neuron is less than a predetermined range, one or more learning rule parameters for a learning rule are adjusted such that the learning rule increases synaptic potentiation on electronic synapses connected to an axon of the electronic neuron.

8. The method of claim 1, wherein dynamically maintaining total synaptic weights in the spiking neuronal network further comprises:
    for each electronic neuron, dynamically maintaining a corresponding total in-coming synaptic weight for said electronic neuron at a predetermined range, and dynamically maintaining a corresponding total out-going synaptic weight for said electronic neuron at a predetermined range, wherein said corresponding total in-coming synaptic weight is based on each synaptic weight for each electronic synapse connected to a dendrite of said neuron, and wherein said corresponding total out-going synaptic weight is based on each synaptic weight for each electronic synapse connected to each axon of said neuron.

9. The method of claim 8, wherein:
    dynamically maintaining a corresponding total in-coming synaptic weight for an electronic neuron at a predetermined range, and dynamically maintaining a corresponding total out-going synaptic weight for said electronic neuron at a predetermined range comprises synaptic weight normalization by adjusting one or more learning rule parameters for a learning rule, wherein a synaptic weight for at least one electronic synapse connected to a dendrite of said electronic neuron is normalized.

10. The method of claim 9, wherein:
if a corresponding total out-going synaptic weight for an electronic neuron is greater than a predetermined range, one or more learning rule parameters for a learning rule are adjusted such that the learning rule decreases synaptic potentiation on electronic synapses connected to an axon of the electronic neuron; and
if a corresponding total out-going synaptic weight for an electronic neuron is less than a predetermined range, one or more learning rule parameters for a learning rule are adjusted such that the learning rule increases synaptic potentiation on electronic synapses connected to an axon of the electronic neuron;
if a corresponding total in-coming synaptic weight for an electronic neuron is greater than a predetermined range, one or more learning rule parameters for a learning rule are adjusted such that the learning rule decreases synaptic potentiation on electronic synapses connected to a dendrite of the electronic neuron; and
if a corresponding total in-coming synaptic weight for an electronic neuron is less than a predetermined range, one or more learning rule parameters for a learning rule are adjusted such that the learning rule increases synaptic potentiation on electronic synapses connected to a dendrite of the electronic neuron.

11. The method of claim 4, further comprising:
utilizing a distributed memory multiprocessor system including multiple processors for simulating a spiking neuronal network, wherein electronic neurons are distributed among local memories of the multiple processors;
wherein a corresponding total in-coming synaptic weight for an electronic neuron is determined by communicating each synaptic weight for each electronic synapse connected to a dendrite of said electronic neuron to a processor corresponding to said electronic neuron, wherein a synaptic weight is communicated said processor based on one or more of the following: on a periodic basis, and with one or more spike messages.

12. The method of claim 4, wherein:
the neuronal network further comprises a synaptic crossbar array interconnecting the electronic neurons, wherein the crossbar array comprises a plurality of axon paths and a plurality of dendrite paths, wherein the axon paths and the dendrite paths are orthogonal to one another, and wherein each electronic synapse is at a cross-point junction of the crossbar array coupled between a dendrite path and an axon path; and
a total in-coming synaptic weight is determined for each dendrite path, wherein a total in-coming synaptic weight for a dendrite path is based on each synaptic weight for each electronic synapse coupled to said dendrite path.

13. The method of claim 7, further comprising:
utilizing a distributed memory multiprocessor system including multiple processors for simulating a spiking neuronal network, wherein electronic neurons are distributed among local memories of the multiple processors;
wherein a corresponding total out-going synaptic weight for an electronic neuron is determined by communicating each synaptic weight for each electronic synapse connected to each axon of said electronic neuron to a processor corresponding to said electronic neuron, wherein a synaptic weight is communicated said processor based on one or more of the following: on a periodic basis, and with one or more spike messages.

14. The method of claim 7, wherein:
the neuronal network further comprises a synaptic crossbar array interconnecting the electronic neurons, wherein the crossbar array comprises a plurality of axon paths and a plurality of dendrite paths, wherein the axon paths and the dendrite paths are orthogonal to one another, and wherein each electronic synapse is at a cross-point junction of the crossbar array coupled between a dendrite path and an axon path; and
a total out-going synaptic weight is determined for each axon path, wherein a total out-going synaptic weight for an axon path is based on each synaptic weight for each electronic synapse coupled to said axon path.

15. The method of claim 10, further comprising:
utilizing a distributed memory multiprocessor system including multiple processors for simulating a spiking neuronal network, wherein electronic neurons are distributed among local memories of the multiple processors;
wherein a corresponding total out-going synaptic weight for an electronic neuron is determined by communicating each synaptic weight for each electronic synapse connected to each axon of said electronic neuron to a processor corresponding to said electronic neuron, wherein a synaptic weight is communicated said processor based on one or more of the following: on a periodic basis, and with one or more spike messages; and
wherein a corresponding total in-coming synaptic weight for an electronic neuron is determined by communicating each synaptic weight for each electronic synapse connected to a dendrite of said electronic neuron to a processor corresponding to said electronic neuron, wherein a synaptic weight is communicated said processor based on one or more of the following: on a periodic basis, and with one or more spike messages.

16. The method of claim 10, wherein:
the neuronal network further comprises a synaptic crossbar array interconnecting the electronic neurons, wherein the crossbar array comprises a plurality of axon paths and a plurality of dendrite paths, wherein the axon paths and the dendrite paths are orthogonal to one another, and wherein each electronic synapse is at a cross-point junction of the crossbar array coupled between a dendrite path and an axon path;
a total out-going synaptic weight is determined for each axon path, wherein a total out-going synaptic weight for an axon path is based on each synaptic weight for each electronic synapse coupled to said axon path; and
a total in-coming synaptic weight is determined for each dendrite path, wherein a total in-coming synaptic weight for a dendrite path is based on each synaptic weight for each electronic synapse coupled to said dendrite path.

17. A spiking neuronal network system, comprising:
a synaptic interconnect network for interconnecting electronic neurons, wherein the interconnect network comprises a plurality of axon paths and a plurality of dendrite paths, wherein each electronic synapse is at a cross-point junction of the interconnect network coupled between a dendrite path and an axon path, and wherein each electronic synapse is configured for connecting axons of source electronic neurons to dendrites of target electronic neurons in the crossbar array; and each electronic synapse having a synaptic weight based on learning rules for the neuronal network, such that a synaptic weight for an electronic synapse determines the effect of a spiking source electronic neuron on a target electronic neuron connected via that electronic synapse;

wherein total synaptic weights in the spiking neuronal network are dynamically maintained at a predetermined range for neural network stability by adjusting a synaptic weight for at least one electronic synapse; and wherein, for an electronic synapse connected to an electronic neuron, a synaptic weight for said electronic synapse is adjusted based on a total synaptic weight for electronic synapses connected to said electronic neuron.

18. The system of claim 17, wherein the interconnect network further comprises a synaptic crossbar array interconnecting the electronic neurons, wherein the crossbar array includes said plurality of axon paths and said plurality of dendrite paths, wherein said plurality of axon paths and said plurality of dendrite paths are orthogonal to one another, and wherein each electronic synapse is at a cross-point junction of the crossbar array coupled between a dendrite path and an axon path.

19. A spiking neuronal network system, comprising:

a synaptic interconnect network for interconnecting electronic neurons via electronic synapses, wherein the interconnect network comprises a plurality of axon paths and a plurality of dendrite paths, wherein each electronic synapse is at a cross-point junction of the interconnect network coupled between a dendrite path and an axon path, and wherein each electronic synapse is configured for connecting axons of source electronic neurons to dendrites of target electronic neurons in the crossbar array; and each electronic synapse having a synaptic weight based on learning rules for the neuronal network, such that a synaptic weight for an electronic synapse determines the effect of a spiking source electronic neuron on a target electronic neuron connected via that electronic synapse;

wherein total synaptic weights in the spiking neuronal network are dynamically maintained at a predetermined range for neural network stability by adjusting a synaptic weight for at least one electronic synapse;

wherein, for an electronic synapse connected to an electronic neuron, a synaptic weight for said electronic synapse is adjusted based on a total synaptic weight for electronic synapses connected to said electronic neuron; and wherein a corresponding total in-coming synaptic weight and a corresponding out-going synaptic weight for each electronic neuron are maintained at a predetermined range utilizing synaptic weight normalization by adjusting one or more learning rule parameters for a learning rule, wherein a synaptic weight for at least one electronic synapse connected to said electronic neuron is normalized.

20. The system of claim 19, wherein:

if a corresponding total out-going synaptic weight for an electronic neuron is greater than a predetermined range, one or more learning rule parameters for a learning rule are adjusted such that the learning rule decreases synaptic potentiation on electronic synapses connected to an axon of the electronic neuron;

if a corresponding total out-going synaptic weight for an electronic neuron is less than a predetermined range, one or more learning rule parameters for a learning rule are adjusted such that the learning rule increases synaptic potentiation on out going synapse devices electronic synapses connected to an axon of the electronic neuron;

if a corresponding total in-coming synaptic weight for an electronic neuron is greater than a predetermined range, one or more learning rule parameters for a learning rule are adjusted such that the learning rule decreases synaptic potentiation on electronic synapses connected to a dendrite of the electronic neuron; and if a corresponding total in-coming synaptic weight for an electronic neuron is less than a predetermined range, one or more learning rule parameters for a learning rule are adjusted such that the learning rule increases synaptic potentiation on electronic synapses connected to a dendrite of the electronic neuron.

21. A computer program product comprising:

a non-transitory computer usable medium having computer readable program code embodied therewith, wherein the computer readable program code when executed on the computer causes the computer to perform operations comprising:

determining synaptic weights for electronic synapses configured for connecting axons of source electronic neurons to dendrites of target electronic neurons in a spiking neuronal network, wherein the synaptic weights are based on learning rules for the neuronal network, such that a synaptic weight for an electronic synapse determines the effect of a spiking source electronic neuron on a target electronic neuron connected via that electronic synapse; and dynamically maintaining total synaptic weights in the spiking neuronal network at a predetermined range for neural network stability by adjusting a synaptic weight for at least one electronic synapse;

wherein, for an electronic synapse connected to an electronic neuron, a synaptic weight for said electronic synapse is adjusted based on a total synaptic weight for electronic synapses connected to said electronic neuron.

22. The computer program product of claim 21, wherein the program code further causes the computer to perform operations further comprising:

dynamically maintaining total synaptic weights in the spiking neuronal network by, for each electronic neuron, dynamically maintaining a corresponding total in-coming synaptic weight for said electronic neuron at a predetermined range, wherein said corresponding total in-coming synaptic weight is based on each synaptic weight for each electronic synapse connected to a dendrite of said neuron; and dynamically maintaining a corresponding total in-coming synaptic weight for an electronic neuron at a predetermined range comprises synaptic weight normalization by adjusting one or more learning rule parameters for a learning rule, wherein a synaptic weight for at least one electronic synapse connected to a dendrite of said electronic neuron is normalized;

wherein, if a corresponding total in-coming synaptic weight for an electronic neuron is greater than a predetermined range, one or more learning rule parameters for a learning rule are adjusted such that the learning rule decreases synaptic potentiation on electronic synapses connected to a dendrite of the electronic neuron; and wherein, if a corresponding total in-coming synaptic weight for an electronic neuron is less than a predetermined range, one or more learning rule parameters for a learning rule are adjusted such that the learning rule increases synaptic potentiation on electronic synapses connected to a dendrite of the electronic neuron.

23. The computer program product of claim 21, wherein the program code further causes the computer to perform operations further comprising:

dynamically maintaining total synaptic weights in the spiking neuronal network by, for each electronic neuron, dynamically maintaining a corresponding total out-going synaptic weight for said electronic neuron at a predetermined range, wherein said corresponding total out-going synaptic weight is based on each synaptic weight for each electronic synapse connected to each axon of said neuron; and dynamically maintaining a corresponding total out-going synaptic weight for an electronic neuron at a predetermined range comprises synaptic weight normalization by adjusting one or more learning rule parameters for a learning rule, wherein a synaptic weight for at least one electronic synapse connected to an axon of said electronic neuron is normalized;

wherein, if a corresponding total out-going synaptic weight for an electronic neuron is greater than a predetermined range, one or more learning rule parameters for a learning rule are adjusted such that the learning rule decreases synaptic potentiation on electronic synapse connected to an axon of the electronic neuron; and wherein, if a corresponding total out-going synaptic weight for an electronic neuron is less than a predetermined range, one or more learning rule parameters for a learning rule are adjusted such that the learning rule increases synaptic potentiation on electronic synapses connected to an axon of the electronic neuron.

24. The computer program product of claim 21, wherein the program code further causes the computer to perform operations further comprising:

dynamically maintaining total synaptic weights in the spiking neuronal network by, for each electronic neuron, dynamically maintaining a corresponding total in-coming synaptic weight and a corresponding total out-going synaptic weight for said electronic neuron at a predetermined range, wherein said corresponding total in-coming synaptic weight is based on each synaptic weight for each electronic synapse connected to a dendrite of said neuron, and wherein said corresponding total out-going synaptic weight is based on each synaptic weight for each electronic synapse connected to each axon of said neuron;

dynamically maintaining a corresponding total in-coming synaptic weight and a corresponding total out-going synaptic weight for an electronic neuron at a predetermined range utilizing synaptic weight normalization by adjusting one or more learning rule parameters for a learning rule, wherein a synaptic weight for at least one electronic synapse connected to an axon of said electronic neuron is normalized;

wherein, if a corresponding total out-going synaptic weight for an electronic neuron is greater than a predetermined range, one or more learning rule parameters for a learning rule are adjusted such that the learning rule decreases synaptic potentiation on electronic synapses connected to an axon of the electronic neuron;

wherein, if a corresponding total out-going synaptic weight for an electronic neuron is less than a predetermined range, one or more learning rule parameters for a learning rule are adjusted such that the learning rule increases synaptic potentiation on electronic synapses connected to an axon of the electronic neuron;

wherein, if a corresponding total in-coming synaptic weight for an electronic neuron is greater than a predetermined range, one or more learning rule parameters for a learning rule are adjusted such that the learning rule decreases synaptic potentiation on electronic synapses connected to a dendrite of the electronic neuron; and wherein, if a corresponding total in-coming synaptic weight for an electronic neuron is less than a predetermined range, one or more learning rule parameters for a learning rule are adjusted such that the learning rule increases synaptic potentiation on electronic synapses connected to a dendrite of the electronic neuron.

25. The computer program product of claim 21, wherein:

the computer comprises a distributed memory multiprocessor system including multiple processors for simulating a spiking neuronal network, wherein electronic neurons are distributed among local memories of the multiple processors;

the program code further causes the computer to perform operations wherein a corresponding total in-coming synaptic weight for an electronic neuron is determined by communicating each synaptic weight for each electronic synapse connected to a dendrite of said electronic neuron to a processor corresponding to said electronic neuron, wherein a synaptic weight is communicated said processor based on one or more of the following: on a periodic basis, and with one or more spike messages.

* * * * *